United States Patent [19]

Enomoto et al.

[11] 4,375,873
[45] Mar. 8, 1983

[54] TEMPERATURE RESPONSIVE VALVE

[75] Inventors: Katsunori Enomoto, Kariya; Tomomitsu Muramatsu, Hekinan; Shiro Maeda, Kariya, all of Japan

[73] Assignee: Nippondenso Co., Ltd., Kariya, Japan

[21] Appl. No.: 302,389

[22] Filed: Sep. 15, 1981

[30] Foreign Application Priority Data

Oct. 23, 1980 [JP] Japan ................... 55-150427[U]

[51] Int. Cl.³ .............................................. G05D 23/12
[52] U.S. Cl. ................................. 236/86; 137/625.48; 236/100
[58] Field of Search ............... 236/86, 100, 99 K; 137/625.48, 625.69

[56] References Cited

U.S. PATENT DOCUMENTS

| | | | |
|---|---|---|---|
| 2,736,604 | 2/1956 | Albright | 236/100X |
| 3,841,551 | 10/1974 | Ota | 236/100 X |
| 3,951,166 | 4/1976 | Whitener | 137/625.69 X |
| 3,960,321 | 6/1976 | Steele, Jr. | 236/100 |
| 4,165,035 | 8/1979 | Maltby | 236/100 X |
| 4,285,467 | 8/1981 | Maltby | 236/86 |

*Primary Examiner*—William E. Tapolcai
*Attorney, Agent, or Firm*—Cushman, Darby & Cushman

[57] ABSTRACT

A temperature responsive valve comprising a hollow housing having three ports, a cylinder mounted in and to the housing assembly in the vicinity of one of the ports, the cylinder having a gas escape space through which said one of the ports communicates with the hollow portion of the housing assembly, a thermal expansive member which changes in its cubical volume in response to an external temperature; and a valve body which is connected to the thermal expansive member and which is movably arranged in the cylinder via a single seal member so as to engage with or disengage from the cylinder in accordance with the cubical change of the thermal expansive member.

2 Claims, 3 Drawing Figures

TEMPERATURE RESPONSIVE VALVE

This invention relates to a temperature responsive valve which can be used as, for example, a directional control device for a vacuum operated exhaust gas recirculating valve (EGR valve) for pollution control in an internal combustion engine.

This kind of temperature responsive three-ports valve usually has a temperature detecting member, such as a thermal expansive wax, which is located in a housing having three ports to detect the temperature of a thermal medium (e.g. the temperature of an engine coolant, or the temperature of the exhaust gas, etc), and a valve body for directional control of the three ports in response to the temperature detecting member.

In order to increase the flow rate of the exhaust gas, it is necessary to increase the cross sectional area of the ports. In a conventional directional control valve in which the displacement of the valve body causes the ports to be directly opened or closed, the increase of the area of the ports means an increase of the displacement of the valve body, which in turn means an increase of the amount of cubical expansion of the thermal expansive member. Furthermore, the increase of the amount of cubical expansion of the thermal expansive member needs the provision of a strong or large return spring for returning the valve body to its initial position.

Alternatively, if directional control of the ports is intended to be effected by a small amount of cubical expansion of the thermal expansive member, it is necessary to provide two seal members (e.g. O-rings) arranged in the direction of the movement of the valve body.

The primary object of the present invention is, therefore, to provide a temperature responsive three-ports valve which can effect a directional control of the ports by a valve body with a single seal member under a small amount of cubical expansion of a thermal expansive member.

Another object of the present invention is to provide a temperature responsive three-ports valve which ensures a large flow rate.

The invention will be discussed below in detail, with reference to the accompanying drawings, in which.

Figure 2:
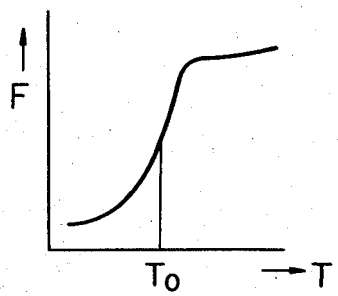
FIG. 2 is a diagram showing the relationship between the cubical variation and the temperature, of a thermal expansive member in the present invention.

First and second housings 1 and 2 are connected to each other in a gastight fashion. The gastight connection can be ensured by an O-ring 3 provided between the housings 1 and 2. Preferably, one end of the second housing 2 is fitted in one end 1a of the first housing 1 and then the first end 1a is crimped around the second housing 2. To the other end of the first housing 1 is connected a hollow cover 4 also in a gastight fashion. The housings 1 and 2 form, together with the hollow cover 4, a housing assembly which can be attached to an engine body (not shown) by means of a threaded portion 1b formed on the periphery of the first housing 1, so that the housing assembly is located in a thermal medium, such as an engine coolant. Between the first housing 1 and the cover 4 is arranged a diaphragm 5 so as to close the hollow portion 30 of the cover 4. In the hollow portion 30 is located a thermal expansive member 6 which may be, for example, a wax having a high thermal conductive flour copper mixed therewith. The thermal expansive member 6 has characteristics of a thermal expansion coefficient as shown in FIG. 2 in which the cubical volume change F of the thermal expansive member 6 suddenly increases when the temperature T of the thermal medium (e.g. the engine coolant) reaches a predetermined value $T_0$ at which the thermal expansive member 6 in the form of a solid is liquidized.

The first housing 1 has therein a hollow portion 31 in which a semifluid material 7 is put and sealed. The semifluid material 7 has a characteristic that the volume thereof does not vary even when it is compressed. The first housing 1 has also an axial bore 32 connected to the hollow portion 31. In the axial bore 32 are arranged a rubber piston 8, a protective sheet 9 which is preferably made of Teflon (Dupont's trademark), and a metal shaft 10, in this order from the bottom. The sheet 9 is located between the shaft 10 and the piston 8 to prevent the piston 8 from coming in direct contact with the shaft 10. The piston 8 serves also as a seal of the semifluid material 7. The shaft 10 is slidable in the axial bore 32 so that the shaft 10 is displaced upward in the axial bore 32, due to the cubical expansion of the thermal expansive member 6, via the diaphragm 5, the semifluid material 7, the piston 8, and the seal (sheet) 9.

Two valve chambers 11a and 11b are formed in the housings 1 and 2. To the upper end of the shaft 10 is rigidly connected a valve body 12 which is provided, on its upper end, with a peripheral groove 35 in which a single seal member such as an O-ring 13 is fitted. A cylinder 15 is press-fitted in the housing 2 and is attached to the latter in a gas tight fashion with the help of an O-ring 16 provided between the cylinder 15 and the housing 2. The cylinder 15 is always urged upward by a return spring 14 arranged between the cylinder 15 and the valve body 12. The spring 14 also causes the valve body 12 to press against the housing 1. The two valve chambers 11a and 11b are separated from one another when the O-ring 13 comes into contact with an inner periphery 15b of the cylinder 15. The inner periphery 15b of the cylinder 15 provides a valve seat surface for the valve body 12. The cylinder 15 has a lower end 15a which is adapted to guide the spring 14. The other end, i.e. the upper end of the cylinder 15 has a cut out portion which provides a peripheral gas escape space 15c which ensures a selective connection between three ports 18, 19 and 20. The gas escape space 15c makes also it possible to effect a directional control of the ports by a slight change of the cubical volume of the thermal expansive member 6. The ports 18, 19 and 20 are provided on the second housing 2. The first port 18 normally opens into the valve chamber 11a and the second and third ports 19 and 20 normally open into the valve chamber 11b. The diameter of the inner periphery 15b of the cylinder 15 is identical to the diameter of an inner periphery 2a of the housing 2. The inner periphery 2a of the housing 2 provides a valve seat surface for the valve body 12. The ports 18, 19 and 20 extend in the same direction. The port 19 is located so that it does not come into contact with the cylinder 15 and it opens into the gas escape space 15c. Between the cylinder 15 and a shoulder or seat portion 2b of the housing 2 is provided an annular gap 17.

As mentioned above, the valve of the present invention is screwed, for example, in a wall of a passage (not shown) of an engine coolant (water), by means of the threaded portion 1a of the housing 1. When the temperature of the coolant is below a predetermined value to (FIG. 2), the shaft 10 and the valve body 12 integral therewith are pushed downward in FIG. 1, by means of the spring 14, so that the O-ring 13 on or in the vicinity of the upper end of the valve body 12 comes into seal contact with the inner periphery 15b of the cylinder 15. In this position of the valve body 12 which is referred to as a first position, the first port 18 does not communicate with the second and third ports 19 and 20 which communicate with each other through the valve chamber 11b of the housing 2 and through the gas escape space 15c of the cylinder 15.

When the temperature of the engine coolant increases and reaches the predetermined value $T_0$, the thermal expansive member 6 suddenly expands and causes the shaft 10 and the valve body 12 to move upwards against the spring 14. Consequently, the O-ring 13 of the valve body 12 separates from the cylinder 15 and comes into contact with the inner periphery 2a of the housing 2. Further expansion of the thermal expansive member 6 causes the valve body 12 to move upwards. During this further upward movement of the valve body 12, the O-ring 13 slides on the inner periphery 2a of the housing 2 while keeping a close contact with the inner periphery 2a. The excess expansion of the thermal expansive member 6 can be thus absorbed by the upward movement of the valve body 12. In a second position in which the O-ring 13 is in close contact with the inner periphery 2a, the communication between the second and third ports 19 and 20 is broken, and, on the other hand, the communication between the second port 19 and the first port 18 is established by means of the gas escape space 15c and the valve chamber 11a.

When the temperature of the engine coolant decrease again and is below the predetermined valve $T_0$, the thermal expansive member 6 is contracted so that the shaft 10 and the valve body 12 are returned to their initial position (first position) by means of the spring 14.

It should be noted that since the valve body 12 is coaxially press-fitted on the shaft 10, the valve body 12 can move in the valve chambers 11a and 11b without being inclined, so that the O-ring 13 ensures a reliable seal effect and is prevented from being worn only at one side thereof.

Figure 1:
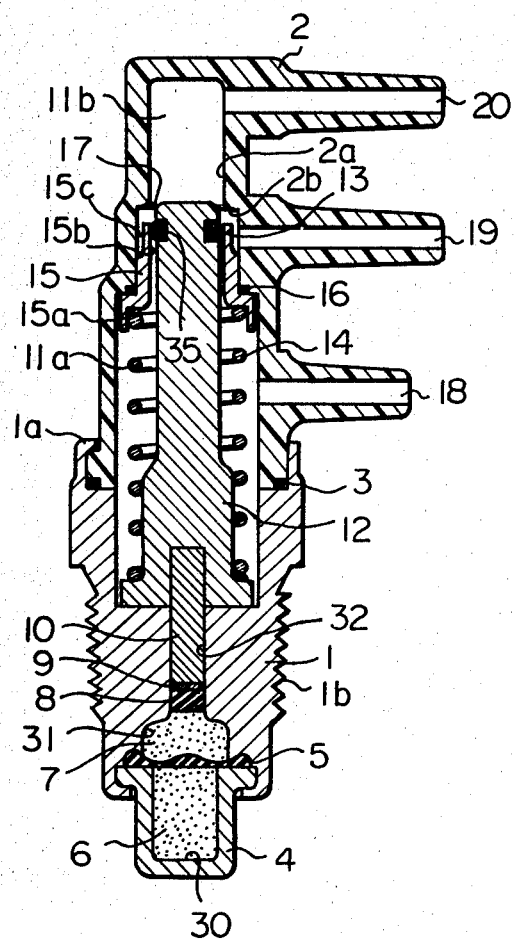
FIG. 1 is a longitudinal sectional view of a three-ports valve according to the present invention.
Figure 3:
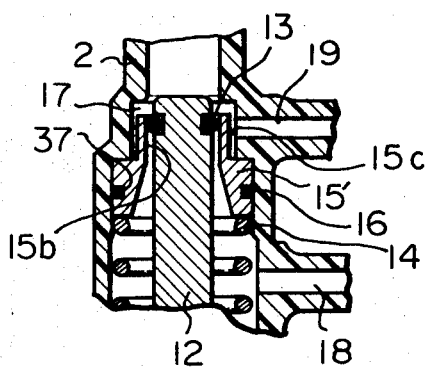
FIG. 3 is a view similar to FIG. 1, but showing only a main part of another embodiment of the present invention.

FIG. 3 shows a variant of FIG. 1, in which the modification is mainly directed to the cylinder. In FIG. 3, the cylinder 15' has a peripheral O-ring groove 37 in which the O-ring 16 is fitted (In FIG. 1, the O-ring 16 is provided in the housing 2.). The cylinder 15' is secured in the housing 2. The inner periphery of the upper end of the cylinder 15' is rounded so that, when the valve body 12 comes from its second position to the first position, the rounded upper end of the cylinder 15' enables the valve body 12 to easily come in to the cylinder 15' without being damaged by the upper end of the cylinder. The inner lower end of the cylinder 15' is tapered to easily assemble the valve body 12 in the cylinder 15'.

As can be seen from the above discussion, according to the present invention, by the provision of the cylinder having a gas escaping space in the vicinity of one of the ports, a two-position directional control can be easily effected by a small displacement of a valve body and only one O-ring needs to be provided on the valve body, thus resulting in simplification of the construction.

Furthermore, since the gap 17 which is provided between the cylinder 15 (or 15') and the shoulder portion 2b of the housing 2 is located around the valve body 12, the gap 17 contributes to an increase of the flow rate of the gas passing therethrough. That is, according to a prior art in which the port 19 is opened and closed directly by the side wall of the valve body 12, the cross sectional area of the passage through which the gas flows depends on the cross-sectional area of the port 19, whereas in our invention the flow rate depends on the gap 17. Generally speaking, the diameter of the valve chamber 11b is about three times the diameter of the port 19, and accordingly, the cross-sectional area of the gap is considerably larger than that of the port 19.

We claim:

1. A temperature responsive valve comprising:

a first housing which comprises first, second and third ports arranged in this order and a valve seat surface provided in the vicinity of the second port, said first housing having a hollow portion which communicates with the three ports;

a second housing connected to the first housing;

a cylinder located in the vicinity of the second port in the first housing, said cylinder having a valve seat surface and defining a fluid escape space between the hollow portion of the first housing and the second port;

a valve body movable in the hollow portion of the first housing;

a single seal member provided on the valve body in the vicinity of the cylinder;

a spring for pressing the valve body and for bringing the seal member into contact with the valve seat surface of the cylinder, said spring pressing the cylinder against the first housing; and, a thermal expansive member for moving the valve body against the spring in accordance with a change of an external temperature, so that when the external temperature is above a predetermined value, the seal member is brought into engagement with the valve seat surface of the first housing;

said three ports being arranged so that when the seal member is in engagement with the valve seat surface of the first housing, the first port is connected to the second port by means of the fluid escape space and the hollow portion of the first housing, and when the seal member is in engagement with the valve seat surface of the cylinder, the second port is connected to the third port by means of the fluid escape space.

2. A temperature responsive valve comprising:

a hollow housing with three ports having a valve seat surface;

a cylinder mounted in and to the housing in the vicinity of one of the ports, said cylinder having a valve seat surface and defining a gas escape space through which said one of the ports communicates with the interior of the housing;

a thermal expansive member which changes in its cubical volume in response to an external temperature;

a valve body which is movably arranged in the cylinder;

a connecting shaft between the valve body and the thermal expansive member;

a semi-fluid material between the connecting shaft and the thermal expansive member for transmitting the cubical change of the latter to the valve body; and a spring for pressing the valve body against the housing, said cylinder being mounted to the housing by means of the spring;

said valve body having a single seal member which can selectively engage with the valve seat surface of the cylinder or of the housing in accordance with the cubical volume change of the thermal expansive member, so that the displacement of the valve body selectively establishes and breaks the fluid connection between the three ports.

* * * * *